US011443342B2

(12) United States Patent
Handel et al.

(10) Patent No.: US 11,443,342 B2
(45) Date of Patent: *Sep. 13, 2022

(54) SYSTEM FOR RESOURCE SERVICE PROVIDER

(71) Applicant: DEEM, INC., San Francisco, CA (US)

(72) Inventors: Sean Handel, Moss Beach, CA (US); Patrick Grady, San Francisco, CA (US); Mark Orttung, Menlo Park, CA (US); Dan Kikinis, Saratoga, CA (US)

(73) Assignee: Deem, Inc., San Francisco, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 16/276,213

(22) Filed: Feb. 14, 2019

(65) Prior Publication Data

US 2019/0180323 A1 Jun. 13, 2019

Related U.S. Application Data

(63) Continuation of application No. 14/834,277, filed on Aug. 24, 2015, now Pat. No. 10,217,131, which is a (Continued)

(51) Int. Cl.
*G06Q 30/02* (2012.01)
*G06Q 10/08* (2012.01)
(Continued)

(52) U.S. Cl.
CPC ... *G06Q 30/0252* (2013.01); *G06F 16/24575* (2019.01); *G06Q 10/00* (2013.01);
(Continued)

(58) Field of Classification Search
None
See application file for complete search history.

(56) References Cited

U.S. PATENT DOCUMENTS 4,812,843 A 3/1989 Champion, III et al.
4,969,136 A 11/1990 Chamberlin et al.
(Continued)

FOREIGN PATENT DOCUMENTS

JP 2002334115 11/2002
JP 2004334409 A 11/2004

OTHER PUBLICATIONS

Alag, Satnam et al., U.S. Appl. No. 11/067,537, entitled "Platform for Multi-service Procurement," filed Feb. 24, 2005.
(Continued)

*Primary Examiner* — Mark D Featherstone
*Assistant Examiner* — Navneet Gmahl
(74) *Attorney, Agent, or Firm* — Thompson Coburn LLP

(57) ABSTRACT

In one embodiment, a system, is provided to take not just a person's time and location into consideration, but also has knowledge of and takes into account their availability, their preferences, their schedule, their purpose for being at their current location, and/or their next goal or stop. One embodiment is able to take into account a real-time view of supplier inventory and deduce and make available much better-adapted offerings and support for that person's travels and endeavors. In one embodiment, having an understanding of a rate of conversion and its relation to traffic and weather patterns allows service providers to make more accurate predictions about various items, including but not limited to, conversion rates, offer types, offer upgrades, traffic etc. In yet another aspect of the invention, the information collected from many travelers, and also information collected from airlines and weather observers, etc., can be used to forecast inventory requirements, such as obtaining and preparing fresh food and pulling from storage chilled or frozen food, as well as man power or staffing level requirements, to meet projected demands.

20 Claims, 7 Drawing Sheets

Related U.S. Application Data continuation of application No. 11/388,540, filed on Mar. 23, 2006, now Pat. No. 9,117,223, which is a continuation-in-part of application No. 11/321,769, filed on Dec. 28, 2005, now abandoned.

(51) Int. Cl.
- *G06Q 50/30* (2012.01)
- *G06Q 10/00* (2012.01)
- *G06F 16/2457* (2019.01)

(52) U.S. Cl.
CPC ....... *G06Q 10/087* (2013.01); *G06Q 30/0207* (2013.01); *G06Q 30/0261* (2013.01); *G06Q 30/0264* (2013.01); *G06Q 50/30* (2013.01)

(56) References Cited

U.S. PATENT DOCUMENTS

| | | | |
|---|---|---|---|
| 5,237,499 | A | 8/1993 | Garback |
| 5,289,531 | A | 2/1994 | Levine |
| 5,404,291 | A | 4/1995 | Kerr et al. |
| 5,422,816 | A | 6/1995 | Sprague et al. |
| 5,459,859 | A | 10/1995 | Senda |
| 5,513,126 | A | 4/1996 | Harkins et al. |
| 5,548,515 | A | 8/1996 | Pilley et al. |
| 5,559,707 | A | 9/1996 | DeLorme et al. |
| 5,615,109 | A * | 3/1997 | Eder ............... G06Q 10/06 705/7.12 |
| 5,615,121 | A | 3/1997 | Babayev et al. |
| 5,623,404 | A | 4/1997 | Collins et al. |
| 5,655,081 | A | 8/1997 | Bonnell et al. |
| 5,754,953 | A | 5/1998 | Briancon et al. |
| 5,765,140 | A | 6/1998 | Knudson et al. |
| 5,790,974 | A | 8/1998 | Tognazzini |
| 5,809,250 | A | 9/1998 | Kisor |
| 5,812,844 | A | 9/1998 | Jones et al. |
| 5,832,451 | A | 11/1998 | Flake et al. |
| 5,832,453 | A | 11/1998 | O'Brien |
| 5,839,114 | A | 11/1998 | Lynch et al. |
| 5,850,433 | A | 12/1998 | Rondeau |
| 5,862,490 | A | 1/1999 | Sasuta et al. |
| 5,875,436 | A | 2/1999 | Kikinis |
| 5,892,909 | A | 4/1999 | Grasso et al. |
| 5,901,352 | A | 5/1999 | St-Pierre et al. |
| 5,924,080 | A | 7/1999 | Johnson |
| 5,933,485 | A | 8/1999 | Chang et al. |
| 5,943,652 | A | 8/1999 | Sisley et al. |
| 5,948,040 | A | 9/1999 | DeLorme et al. |
| 5,953,706 | A | 9/1999 | Patel |
| 5,963,861 | A | 10/1999 | Hanson |
| 5,963,913 | A | 10/1999 | Henneuse et al. |
| 5,966,658 | A | 10/1999 | Kennedy, III et al. |
| 5,987,377 | A | 11/1999 | Westerlage et al. |
| 6,009,408 | A | 12/1999 | Buchanan |
| 6,011,976 | A | 1/2000 | Michaels et al. |
| 6,016,478 | A | 1/2000 | Zhang et al. |
| 6,018,715 | A | 1/2000 | Lynch et al. |
| 6,023,679 | A | 2/2000 | Acebo et al. |
| 6,023,722 | A | 2/2000 | Colyer |
| 6,035,332 | A | 3/2000 | Ingrassia, Jr. et al. |
| 6,038,542 | A | 3/2000 | Ruckdashel |
| 6,041,305 | A | 3/2000 | Sakurai |
| 6,044,257 | A | 3/2000 | Boling et al. |
| 6,047,327 | A | 4/2000 | Tso et al. |
| 6,049,778 | A | 4/2000 | Walker et al. |
| 6,052,563 | A | 4/2000 | Macko |
| 6,058,179 | A | 5/2000 | Shaffer et al. |
| 6,076,108 | A | 6/2000 | Courts et al. |
| 6,085,166 | A | 7/2000 | Beckhardt et al. |
| 6,091,956 | A | 7/2000 | Hollenberg |
| 6,094,681 | A | 7/2000 | Shaffer et al. |
| 6,101,480 | A | 8/2000 | Conmy et al. |
| 6,104,788 | A | 8/2000 | Shaffer et al. |
| 6,119,094 | A | 9/2000 | Lynch et al. |
| 6,134,534 | A | 10/2000 | Walker et al. |
| 6,144,942 | A | 11/2000 | Ruckdashel |
| 6,148,261 | A | 11/2000 | Obradovich et al. |
| 6,157,945 | A | 12/2000 | Balma et al. |
| 6,169,955 | B1 | 1/2001 | Fultz |
| 6,173,279 | B1 | 1/2001 | Levin et al. |
| 6,177,905 | B1 | 1/2001 | Welch |
| 6,189,003 | B1 | 2/2001 | Leal |
| 6,202,062 | B1 | 3/2001 | Cameron et al. |
| 6,216,227 | B1 | 4/2001 | Goldstein et al. |
| 6,236,978 | B1 | 5/2001 | Tuzhilin |
| 6,240,396 | B1 | 5/2001 | Walker et al. |
| 6,249,252 | B1 | 6/2001 | Dupray |
| 6,253,369 | B1 | 6/2001 | Cloud et al. |
| 6,286,046 | B1 | 9/2001 | Bryant |
| 6,292,783 | B1 | 9/2001 | Rohler et al. |
| 6,292,830 | B1 | 9/2001 | Taylor et al. |
| 6,295,521 | B1 | 9/2001 | DeMarcken et al. |
| 6,298,352 | B1 | 10/2001 | Kannan et al. |
| 6,301,533 | B1 | 10/2001 | Markow |
| 6,317,686 | B1 | 11/2001 | Ran |
| 6,321,158 | B1 | 11/2001 | DeLorme et al. |
| 6,327,359 | B1 | 12/2001 | Kang et al. |
| 6,334,109 | B1 | 12/2001 | Kanevsky et al. |
| 6,336,072 | B1 | 1/2002 | Takayama et al. |
| 6,341,271 | B1 | 1/2002 | Salvo et al. |
| 6,349,238 | B1 | 2/2002 | Gabbita et al. |
| 6,360,205 | B1 | 3/2002 | Iyengar et al. |
| 6,370,566 | B2 | 4/2002 | Discolo et al. |
| 6,374,176 | B1 | 4/2002 | Schmier et al. |
| 6,381,640 | B1 | 4/2002 | Beck et al. |
| 6,389,454 | B1 | 5/2002 | Ralston et al. |
| 6,392,669 | B1 | 5/2002 | Matoba et al. |
| 6,396,920 | B1 | 5/2002 | Cox et al. |
| 6,397,191 | B1 | 5/2002 | Notani et al. |
| 6,414,635 | B1 | 7/2002 | Stewart et al. |
| 6,418,471 | B1 | 7/2002 | Shelton et al. |
| 6,421,705 | B1 | 7/2002 | Northrup |
| 6,442,526 | B1 | 8/2002 | Vance et al. |
| 6,456,207 | B1 | 9/2002 | Yen |
| 6,456,709 | B1 | 9/2002 | Cox et al. |
| 6,457,045 | B1 | 9/2002 | Hanson et al. |
| 6,457,062 | B1 | 9/2002 | Pivowar et al. |
| 6,457,132 | B1 | 9/2002 | Borgendale et al. |
| 6,466,161 | B2 | 10/2002 | Turetzky et al. |
| 6,477,503 | B1 | 11/2002 | Mankes |
| 6,480,830 | B1 | 11/2002 | Ford et al. |
| 6,484,033 | B2 | 11/2002 | Murray |
| 6,501,421 | B1 | 12/2002 | Dutta et al. |
| 6,519,571 | B1 | 2/2003 | Guheen et al. |
| 6,529,136 | B2 | 3/2003 | Cao et al. |
| 6,553,346 | B1 | 4/2003 | Walker et al. |
| 6,571,213 | B1 | 5/2003 | Altendahl et al. |
| 6,574,329 | B2 | 6/2003 | Takeuchi et al. |
| 6,578,005 | B1 | 6/2003 | Lesaint et al. |
| 6,584,448 | B1 | 6/2003 | Laor |
| 6,584,489 | B1 | 6/2003 | Jones et al. |
| 6,587,827 | B1 | 7/2003 | Hennig et al. |
| 6,587,835 | B1 | 7/2003 | Treyz et al. |
| 6,591,263 | B1 | 7/2003 | Becker et al. |
| 6,611,726 | B1 | 8/2003 | Crosswhite |
| 6,618,668 | B1 | 9/2003 | Laird |
| 6,631,363 | B1 | 10/2003 | Brown et al. |
| 6,640,230 | B1 | 10/2003 | Alexander et al. |
| 6,643,622 | B2 | 11/2003 | Stuart et al. |
| 6,643,639 | B2 | 11/2003 | Biebesheimer et al. |
| 6,650,902 | B1 | 11/2003 | Richton |
| 6,658,093 | B1 | 12/2003 | Langseth et al. |
| 6,662,016 | B1 | 12/2003 | Buckham et al. |
| 6,675,151 | B1 | 1/2004 | Thompson et al. |
| 6,687,678 | B1 | 2/2004 | Yorimatsu et al. |
| 6,691,029 | B2 | 2/2004 | Hughes et al. |
| 6,691,153 | B1 | 2/2004 | Hanson et al. |
| 6,700,535 | B2 | 3/2004 | Gilkes et al. |
| 6,701,311 | B2 | 3/2004 | Biebesheimer et al. |
| 6,732,080 | B1 | 5/2004 | Blants |
| 6,732,103 | B1 | 5/2004 | Strick et al. |
| 6,741,969 | B1 | 5/2004 | Chen et al. |
| 6,757,689 | B2 | 6/2004 | Battas et al. |

(56) References Cited

U.S. PATENT DOCUMENTS

| | | | |
|---|---|---|---|
| 6,766,363 B1 | 7/2004 | Rothschild | |
| 6,769,009 B1 | 7/2004 | Reisman | |
| 6,775,371 B2 | 8/2004 | Elsey et al. | |
| 6,785,592 B1 | 8/2004 | Smith et al. | |
| 6,788,946 B2 | 9/2004 | Winchell et al. | |
| 6,801,226 B1 | 10/2004 | Daughtrey | |
| 6,802,005 B1 | 10/2004 | Berson | |
| 6,804,658 B2 | 10/2004 | Lim et al. | |
| 6,826,473 B1 | 11/2004 | Burch et al. | |
| 6,837,427 B2 | 1/2005 | Overhultz et al. | |
| 6,842,737 B1* | 1/2005 | Stiles | G06Q 10/02 705/26.1 |
| 6,845,370 B2 | 1/2005 | Burkey et al. | |
| 6,847,988 B2 | 1/2005 | Toyouchi et al. | |
| 6,857,017 B1 | 2/2005 | Faour et al. | |
| 6,862,575 B1 | 3/2005 | Anttila et al. | |
| 6,868,335 B2 | 3/2005 | Obradovich et al. | |
| 6,882,719 B2 | 4/2005 | Lee | |
| 6,885,996 B2 | 4/2005 | Nicholson | |
| 6,901,438 B1 | 5/2005 | Davis et al. | |
| 6,907,119 B2 | 6/2005 | Case et al. | |
| 6,909,903 B2 | 6/2005 | Wang | |
| 6,934,684 B2 | 8/2005 | Alpdemir et al. | |
| 6,937,991 B1 | 8/2005 | Zompa et al. | |
| 6,944,273 B2 | 9/2005 | Huna | |
| 6,944,479 B2 | 9/2005 | Andaker et al. | |
| 6,958,692 B1 | 10/2005 | Ratschunas | |
| 6,959,287 B2 | 10/2005 | Rabideau et al. | |
| 6,970,871 B1 | 11/2005 | Rayburn | |
| 6,980,993 B2 | 12/2005 | Horvitz et al. | |
| 6,985,902 B2 | 1/2006 | Wise et al. | |
| 6,985,939 B2 | 1/2006 | Fletcher et al. | |
| 6,993,503 B1 | 1/2006 | Heissenbuttel et al. | |
| 6,993,554 B2 | 1/2006 | O'Donnell | |
| 7,010,494 B2 | 3/2006 | Etzioni et al. | |
| 7,013,149 B2 | 3/2006 | Vetro et al. | |
| 7,024,205 B1 | 4/2006 | Hose | |
| 7,027,570 B2 | 4/2006 | Pines et al. | |
| 7,031,945 B1 | 4/2006 | Donner | |
| 7,031,998 B2 | 4/2006 | Archbold | |
| 7,035,811 B2 | 4/2006 | Gorenstein | |
| 7,050,986 B1 | 5/2006 | Vance et al. | |
| 7,050,987 B2 | 5/2006 | Lettovsky et al. | |
| 7,054,939 B2 | 5/2006 | Koch et al. | |
| 7,065,526 B2 | 6/2006 | Wissner et al. | |
| 7,072,666 B2 | 7/2006 | Kullman et al. | |
| 7,072,886 B2 | 7/2006 | Salmenkaita et al. | |
| 7,076,431 B2 | 7/2006 | Kurganov et al. | |
| 7,076,451 B1 | 7/2006 | Coupland et al. | |
| 7,082,402 B2 | 7/2006 | Conmy et al. | |
| 7,092,892 B1 | 8/2006 | Sobalvarro et al. | |
| 7,092,929 B1* | 8/2006 | Dvorak | G06Q 10/087 705/28 |
| 7,099,236 B2 | 8/2006 | Yamagishi | |
| 7,099,855 B1 | 8/2006 | Nelken et al. | |
| 7,103,572 B1 | 9/2006 | Kawaguchi et al. | |
| 7,113,797 B2 | 9/2006 | Kelley et al. | |
| 7,123,141 B2 | 10/2006 | Contestabile | |
| 7,124,024 B1 | 10/2006 | Adelaide et al. | |
| 7,124,089 B2 | 10/2006 | Cornwell | |
| 7,130,814 B1* | 10/2006 | Szabo | G06Q 30/0201 705/26.8 |
| 7,130,885 B2 | 10/2006 | Chandra et al. | |
| 7,136,821 B1 | 11/2006 | Kohavi et al. | |
| 7,139,718 B2 | 11/2006 | Jeyachandran et al. | |
| 7,139,978 B2 | 11/2006 | Rojewski et al. | |
| 7,152,038 B2 | 12/2006 | Murashita et al. | |
| 7,154,621 B2 | 12/2006 | Rodriguez et al. | |
| 7,161,497 B2 | 1/2007 | Gueziec | |
| 7,168,077 B2 | 1/2007 | Kim et al. | |
| 7,171,369 B1 | 1/2007 | Bertram et al. | |
| 7,188,073 B1 | 3/2007 | Tam et al. | |
| 7,188,155 B2 | 3/2007 | Flurry et al. | |
| 7,194,417 B1 | 3/2007 | Jones | |
| 7,213,048 B1 | 5/2007 | Parupudi et al. | |
| 7,222,334 B2 | 5/2007 | Casati et al. | |
| 7,233,955 B2 | 6/2007 | Machida et al. | |
| 7,236,942 B1 | 6/2007 | Walker et al. | |
| RE39,717 E | 7/2007 | Yates et al. | |
| 7,249,195 B2 | 7/2007 | Panec et al. | |
| 7,259,694 B2 | 8/2007 | Myllymaki et al. | |
| 7,263,664 B2 | 8/2007 | Daughtrey | |
| 7,280,823 B2 | 10/2007 | Ternullo et al. | |
| 7,283,970 B2 | 10/2007 | Cragun et al. | |
| 7,284,002 B2 | 10/2007 | Doss et al. | |
| 7,284,033 B2* | 10/2007 | Jhanji | G06Q 30/02 709/204 |
| 7,287,093 B2 | 10/2007 | Lynch et al. | |
| 7,289,812 B1 | 10/2007 | Roberts et al. | |
| 7,296,017 B2 | 11/2007 | Larcheveque et al. | |
| 7,299,286 B2 | 11/2007 | Ramsayer et al. | |
| 7,300,346 B2 | 11/2007 | Lydon et al. | |
| 7,305,356 B2 | 12/2007 | Rodon | |
| 7,305,454 B2 | 12/2007 | Reese et al. | |
| 7,308,420 B1 | 12/2007 | Storch et al. | |
| 7,328,406 B2 | 2/2008 | Kalinoski et al. | |
| 7,330,112 B1 | 2/2008 | Emigh et al. | |
| 7,337,125 B2 | 2/2008 | Kraft et al. | |
| 7,340,048 B2 | 3/2008 | Stern et al. | |
| 7,343,165 B2 | 3/2008 | Obradovich | |
| 7,343,317 B2 | 3/2008 | Jokinen et al. | |
| 7,343,325 B2 | 3/2008 | Shaver et al. | |
| 7,343,338 B2 | 3/2008 | Etkin | |
| 7,359,716 B2 | 4/2008 | Rowitch et al. | |
| 7,367,491 B2 | 5/2008 | Cheng et al. | |
| 7,370,085 B2 | 5/2008 | Brown et al. | |
| 7,376,735 B2 | 5/2008 | Straut et al. | |
| 7,383,225 B2 | 6/2008 | Hallihan | |
| 7,394,900 B1 | 7/2008 | Gerber et al. | |
| 7,395,221 B2 | 7/2008 | Doss et al. | |
| 7,395,231 B2 | 7/2008 | Steury et al. | |
| 7,403,948 B2 | 7/2008 | Ghoneimy et al. | |
| 7,409,643 B2 | 8/2008 | Daughtrey | |
| 7,412,042 B2 | 8/2008 | Henry | |
| 7,415,510 B1 | 8/2008 | Kramerich et al. | |
| 7,418,409 B1* | 8/2008 | Goel | G06Q 10/02 705/26.61 |
| 7,424,292 B2 | 9/2008 | Kobylarz | |
| 7,426,537 B2 | 9/2008 | Lee et al. | |
| 7,430,724 B2 | 9/2008 | Othmer | |
| 7,441,203 B2 | 10/2008 | Othmer et al. | |
| 7,475,145 B2 | 1/2009 | Blizniak et al. | |
| 7,487,112 B2 | 2/2009 | Barnes, Jr. | |
| 7,506,805 B1 | 3/2009 | Chakravarthy | |
| 7,562,027 B1 | 7/2009 | Baggett et al. | |
| 7,599,858 B1 | 10/2009 | Grady et al. | |
| 7,603,291 B2 | 10/2009 | Raiyani et al. | |
| 7,620,619 B1* | 11/2009 | Walker | G06Q 10/02 |
| 7,681,786 B1 | 3/2010 | Chakravarthy | |
| 7,706,808 B1 | 4/2010 | Aggarwal et al. | |
| 7,742,954 B1 | 6/2010 | Handel et al. | |
| 7,806,328 B2 | 10/2010 | Chakravarthy | |
| 7,925,540 B1 | 4/2011 | Orttung et al. | |
| 7,970,666 B1 | 6/2011 | Handel | |
| 8,055,534 B2 | 11/2011 | Ashby et al. | |
| 8,117,073 B1 | 2/2012 | Orttung et al. | |
| 8,180,796 B1 | 5/2012 | Mah et al. | |
| 8,260,921 B2* | 9/2012 | Uyama | H04L 67/22 709/226 |
| 8,332,249 B1* | 12/2012 | Aykin | G06Q 10/06312 705/7.11 |
| 8,543,470 B2 | 9/2013 | Grady et al. | |
| 9,117,223 B1 | 8/2015 | Handel et al. | |
| 10,217,131 B2 | 2/2019 | Handel et al. | |
| 10,552,849 B2 | 2/2020 | Mortimore, Jr. et al. | |
| 2001/0014866 A1 | 8/2001 | Conmy et al. | |
| 2001/0014867 A1 | 8/2001 | Conmy | |
| 2001/0025314 A1 | 9/2001 | Matsumoto et al. | |
| 2001/0029425 A1 | 10/2001 | Myr | |
| 2001/0034626 A1* | 10/2001 | Gillespie | G06Q 10/02 705/6 |
| 2001/0037250 A1* | 11/2001 | Lefkowitz | G06Q 30/0601 705/5 |
| 2001/0042010 A1 | 11/2001 | Hassell | |

(56) References Cited

U.S. PATENT DOCUMENTS

| | | |
|---|---|---|
| 2001/0044748 A1 | 11/2001 | Maier |
| 2001/0047316 A1 | 11/2001 | Hallihan |
| 2001/0049637 A1 | 12/2001 | Tso |
| 2001/0051876 A1 | 12/2001 | Seigel et al. |
| 2001/0056354 A1 | 12/2001 | Feit et al. |
| 2002/0000930 A1 | 1/2002 | Crowson et al. |
| 2002/0007327 A1 | 1/2002 | Steury et al. |
| 2002/0010604 A1 | 1/2002 | Block |
| 2002/0010664 A1 | 1/2002 | Rabideau et al. |
| 2002/0013729 A1 | 1/2002 | Kida |
| 2002/0016723 A1 | 2/2002 | Matsui et al. |
| 2002/0023132 A1 | 2/2002 | Tornabene et al. |
| 2002/0026336 A1 | 2/2002 | Eizenburg et al. |
| 2002/0026356 A1 | 2/2002 | Bergh et al. |
| 2002/0029178 A1 | 3/2002 | Wiederin et al. |
| 2002/0032591 A1 | 3/2002 | Mahaffy et al. |
| 2002/0032597 A1 | 3/2002 | Chanos |
| 2002/0035474 A1 | 3/2002 | Alpdemir |
| 2002/0046076 A1 | 4/2002 | Baillargeon et al. |
| 2002/0046084 A1 | 4/2002 | Steele et al. |
| 2002/0046301 A1 | 4/2002 | Shannon et al. |
| 2002/0049644 A1* | 4/2002 | Kargman ............... G06Q 30/02 705/26.1 |
| 2002/0055906 A1 | 5/2002 | Katz et al. |
| 2002/0057212 A1 | 5/2002 | Hamilton et al. |
| 2002/0067308 A1 | 6/2002 | Robertson |
| 2002/0069093 A1* | 6/2002 | Stanfield ............... G06Q 10/02 705/5 |
| 2002/0072938 A1 | 6/2002 | Black et al. |
| 2002/0073088 A1 | 6/2002 | Beckmann et al. |
| 2002/0077871 A1 | 6/2002 | Udelhoven et al. |
| 2002/0082978 A1 | 6/2002 | Ghouri et al. |
| 2002/0087367 A1 | 7/2002 | Azani |
| 2002/0087384 A1 | 7/2002 | Neifeld |
| 2002/0087706 A1 | 7/2002 | Ogawa |
| 2002/0095333 A1 | 7/2002 | Jokinen et al. |
| 2002/0095454 A1 | 7/2002 | Reed et al. |
| 2002/0099613 A1 | 7/2002 | Swart et al. |
| 2002/0103746 A1 | 8/2002 | Moffett, Jr. |
| 2002/0107027 A1 | 8/2002 | O'Neil |
| 2002/0111845 A1 | 8/2002 | Chong |
| 2002/0111848 A1 | 8/2002 | White |
| 2002/0115430 A1 | 8/2002 | Hall |
| 2002/0116235 A1 | 8/2002 | Grimm et al. |
| 2002/0116266 A1 | 8/2002 | Marshall |
| 2002/0118118 A1 | 8/2002 | Myllymaki et al. |
| 2002/0120519 A1 | 8/2002 | Martin et al. |
| 2002/0120548 A1 | 8/2002 | Etkin |
| 2002/0128903 A1 | 9/2002 | Kernahan |
| 2002/0131565 A1 | 9/2002 | Scheuring et al. |
| 2002/0143655 A1 | 10/2002 | Elston et al. |
| 2002/0143819 A1 | 10/2002 | Han et al. |
| 2002/0145561 A1 | 10/2002 | Sandhu et al. |
| 2002/0151321 A1 | 10/2002 | Winchell et al. |
| 2002/0152190 A1 | 10/2002 | Biebesheimer et al. |
| 2002/0156659 A1 | 10/2002 | Walker et al. |
| 2002/0156731 A1 | 10/2002 | Seki et al. |
| 2002/0156839 A1 | 10/2002 | Peterson et al. |
| 2002/0160745 A1 | 10/2002 | Wang |
| 2002/0161611 A1 | 10/2002 | Price et al. |
| 2002/0165732 A1 | 11/2002 | Ezzeddine et al. |
| 2002/0165903 A1 | 11/2002 | Zargham et al. |
| 2002/0174021 A1 | 11/2002 | Chu et al. |
| 2002/0178034 A1 | 11/2002 | Gardner et al. |
| 2002/0178226 A1 | 11/2002 | Anderson et al. |
| 2002/0184302 A1 | 12/2002 | Prueitt et al. |
| 2002/0194037 A1 | 12/2002 | Creed et al. |
| 2002/0194262 A1 | 12/2002 | Jorgenson |
| 2003/0004762 A1 | 1/2003 | Banerjee et al. |
| 2003/0013438 A1 | 1/2003 | Darby |
| 2003/0018499 A1 | 1/2003 | Miller et al. |
| 2003/0018551 A1 | 1/2003 | Hanson et al. |
| 2003/0018808 A1 | 1/2003 | Brouk et al. |
| 2003/0023463 A1 | 1/2003 | Dombroski et al. |
| 2003/0023499 A1 | 1/2003 | Das et al. |
| 2003/0028390 A1 | 2/2003 | Stern et al. |
| 2003/0033164 A1 | 2/2003 | Faltings et al. |
| 2003/0033179 A1* | 2/2003 | Katz ............... G06Q 10/0639 705/7.12 |
| 2003/0036917 A1 | 2/2003 | Hite et al. |
| 2003/0040946 A1 | 2/2003 | Sprenger et al. |
| 2003/0041178 A1 | 2/2003 | Brouk et al. |
| 2003/0050964 A1 | 3/2003 | Debaty et al. |
| 2003/0053459 A1 | 3/2003 | Brouk et al. |
| 2003/0053611 A1 | 3/2003 | Lee |
| 2003/0058842 A1 | 3/2003 | Bud |
| 2003/0061145 A1 | 3/2003 | Norrid |
| 2003/0065556 A1 | 4/2003 | Takanashi et al. |
| 2003/0065805 A1 | 4/2003 | Barnes, Jr. |
| 2003/0087648 A1 | 5/2003 | Mezhvinsky et al. |
| 2003/0097302 A1 | 5/2003 | Overhultz et al. |
| 2003/0100315 A1 | 5/2003 | Rankin |
| 2003/0110070 A1 | 6/2003 | De Goeij |
| 2003/0110091 A1 | 6/2003 | Inaba et al. |
| 2003/0110104 A1* | 6/2003 | King ................... G06Q 10/087 705/28 |
| 2003/0120530 A1 | 6/2003 | Casati et al. |
| 2003/0120593 A1 | 6/2003 | Bansal et al. |
| 2003/0126095 A1 | 7/2003 | Allen |
| 2003/0126205 A1 | 7/2003 | Lurie |
| 2003/0126250 A1* | 7/2003 | Jhanji ................... G06Q 30/02 709/223 |
| 2003/0132298 A1 | 7/2003 | Swartz et al. |
| 2003/0140172 A1 | 7/2003 | Woods et al. |
| 2003/0149641 A1 | 8/2003 | Kouketsu et al. |
| 2003/0154116 A1 | 8/2003 | Lofton |
| 2003/0154125 A1 | 8/2003 | Mittal et al. |
| 2003/0158493 A1 | 8/2003 | Goor et al. |
| 2003/0158776 A1 | 8/2003 | Landesmann |
| 2003/0158784 A1 | 8/2003 | Shaver et al. |
| 2003/0158847 A1 | 8/2003 | Wissner et al. |
| 2003/0163251 A1 | 8/2003 | Obradovich et al. |
| 2003/0165223 A1 | 9/2003 | Timmins et al. |
| 2003/0171944 A1 | 9/2003 | Fine et al. |
| 2003/0172020 A1 | 9/2003 | Davies et al. |
| 2003/0182413 A1 | 9/2003 | Allen et al. |
| 2003/0187705 A1 | 10/2003 | Schiff et al. |
| 2003/0187743 A1 | 10/2003 | Kumaran et al. |
| 2003/0194065 A1 | 10/2003 | Langseth et al. |
| 2003/0195811 A1 | 10/2003 | Hayes, Jr. et al. |
| 2003/0200146 A1 | 10/2003 | Levin et al. |
| 2003/0204622 A1 | 10/2003 | Blizniak et al. |
| 2003/0208754 A1 | 11/2003 | Sridhar et al. |
| 2003/0212486 A1 | 11/2003 | Hughes et al. |
| 2003/0217044 A1 | 11/2003 | Zhang et al. |
| 2003/0220835 A1 | 11/2003 | Barnes, Jr. |
| 2003/0229900 A1* | 12/2003 | Reisman ........... H04N 21/42204 725/87 |
| 2003/0233265 A1 | 12/2003 | Lee et al. |
| 2003/0233278 A1* | 12/2003 | Marshall ............ G06Q 30/0212 705/14.35 |
| 2004/0014457 A1 | 1/2004 | Stevens |
| 2004/0015380 A1 | 1/2004 | Timmins |
| 2004/0030568 A1 | 2/2004 | Kocznar et al. |
| 2004/0039613 A1 | 2/2004 | Maycotte et al. |
| 2004/0045004 A1 | 3/2004 | Cheenath |
| 2004/0054569 A1 | 3/2004 | Pombo et al. |
| 2004/0054574 A1* | 3/2004 | Kaufman ............... G06Q 30/02 705/14.56 |
| 2004/0064355 A1 | 4/2004 | Dorenbosch et al. |
| 2004/0064503 A1 | 4/2004 | Karakashian et al. |
| 2004/0064585 A1 | 4/2004 | Doss et al. |
| 2004/0073615 A1 | 4/2004 | Darling |
| 2004/0076280 A1 | 4/2004 | Ando et al. |
| 2004/0078247 A1 | 4/2004 | Rowe, III et al. |
| 2004/0078373 A1 | 4/2004 | Ghoneimy et al. |
| 2004/0088107 A1 | 5/2004 | Seligmann |
| 2004/0093290 A1 | 5/2004 | Doss et al. |
| 2004/0098269 A1 | 5/2004 | Wise et al. |
| 2004/0128173 A1 | 7/2004 | Salonen |
| 2004/0128196 A1 | 7/2004 | Shibuno |
| 2004/0139151 A1 | 7/2004 | Flurry et al. |
| 2004/0142678 A1 | 7/2004 | Krasner |
| 2004/0142709 A1 | 7/2004 | Coskun et al. |

(56) References Cited

U.S. PATENT DOCUMENTS

| | | |
|---|---|---|
| 2004/0148207 A1 | 7/2004 | Smith et al. |
| 2004/0153350 A1 | 8/2004 | Kim et al. |
| 2004/0158493 A1 | 8/2004 | Nicholson |
| 2004/0161097 A1 | 8/2004 | Henry |
| 2004/0181461 A1 | 9/2004 | Raiyani et al. |
| 2004/0181572 A1 | 9/2004 | Lee et al. |
| 2004/0184593 A1 | 9/2004 | Elsey et al. |
| 2004/0186891 A1 | 9/2004 | Panec et al. |
| 2004/0193432 A1 | 9/2004 | Khalidi |
| 2004/0193457 A1 | 9/2004 | Shogren |
| 2004/0203909 A1 | 10/2004 | Koster |
| 2004/0204977 A1 | 10/2004 | Obert |
| 2004/0215517 A1 | 10/2004 | Chen et al. |
| 2004/0220847 A1 | 11/2004 | Ogushi et al. |
| 2004/0220854 A1 | 11/2004 | Postrel |
| 2004/0224703 A1 | 11/2004 | Takaki et al. |
| 2004/0225540 A1 | 11/2004 | Waytena et al. |
| 2004/0238622 A1 | 12/2004 | Freiberg |
| 2004/0248551 A1 | 12/2004 | Rowitch et al. |
| 2004/0249700 A1 | 12/2004 | Gross |
| 2004/0249758 A1 | 12/2004 | Sukeda et al. |
| 2004/0267611 A1 | 12/2004 | Hoerenz |
| 2005/0004819 A1 | 1/2005 | Etzioni et al. |
| 2005/0010472 A1 | 1/2005 | Quatse et al. |
| 2005/0014558 A1 | 1/2005 | Estey |
| 2005/0024189 A1 | 2/2005 | Weber |
| 2005/0027570 A1 | 2/2005 | Maier et al. |
| 2005/0033614 A1 | 2/2005 | Lettovsky et al. |
| 2005/0033615 A1 | 2/2005 | Nguyen et al. |
| 2005/0033616 A1 | 2/2005 | Vavul et al. |
| 2005/0033670 A1 | 2/2005 | Cheng et al. |
| 2005/0039136 A1 | 2/2005 | Othmer |
| 2005/0040230 A1 | 2/2005 | Swartz et al. |
| 2005/0040944 A1 | 2/2005 | Contestabile |
| 2005/0043974 A1 | 2/2005 | Vassilev et al. |
| 2005/0053220 A1 | 3/2005 | Helbling et al. |
| 2005/0071245 A1 | 3/2005 | Norins, Jr. et al. |
| 2005/0086098 A1 | 4/2005 | Fulton et al. |
| 2005/0091005 A1 | 4/2005 | Huard |
| 2005/0101335 A1 | 5/2005 | Kelly et al. |
| 2005/0125265 A1 | 6/2005 | Bramnick et al. |
| 2005/0125439 A1 | 6/2005 | Nourbakhsh et al. |
| 2005/0125804 A1 | 6/2005 | Dievendorff et al. |
| 2005/0131761 A1 | 6/2005 | Trika et al. |
| 2005/0138187 A1 | 6/2005 | Breiter et al. |
| 2005/0143064 A1 | 6/2005 | Pines et al. |
| 2005/0149385 A1 | 7/2005 | Trively |
| 2005/0154736 A1* | 7/2005 | Meikleham ............ G06Q 30/00 |
| 2005/0209772 A1 | 9/2005 | Koshikawa et al. |
| 2005/0209902 A1 | 9/2005 | Iwasaki et al. |
| 2005/0215247 A1 | 9/2005 | Kobylarz |
| 2005/0227712 A1 | 10/2005 | Estevez et al. |
| 2005/0228719 A1 | 10/2005 | Roberts et al. |
| 2005/0234928 A1 | 10/2005 | Shkvarchuk et al. |
| 2005/0255861 A1 | 11/2005 | Wilson et al. |
| 2005/0273373 A1 | 12/2005 | Walker et al. |
| 2005/0288948 A1 | 12/2005 | Devulapalli et al. |
| 2005/0288988 A1* | 12/2005 | Yoshida ............... G06Q 10/06 |
| | | 705/7.31 |
| 2006/0004511 A1 | 1/2006 | Yoshikawa et al. |
| 2006/0009987 A1 | 1/2006 | Wang |
| 2006/0010206 A1 | 1/2006 | Apacible et al. |
| 2006/0020565 A1 | 1/2006 | Rzevski et al. |
| 2006/0041477 A1 | 2/2006 | Zheng |
| 2006/0059023 A1 | 3/2006 | Mashinsky |
| 2006/0059024 A1* | 3/2006 | Bailey ............... G06Q 10/025 |
| | | 705/5 |
| 2006/0059107 A1 | 3/2006 | Elmore et al. |
| 2006/0068787 A1 | 3/2006 | Deshpande et al. |
| 2006/0080257 A1 | 4/2006 | Vaughan et al. |
| 2006/0080321 A1 | 4/2006 | Horn et al. |
| 2006/0085276 A1 | 4/2006 | Hoech et al. |
| 2006/0085512 A1 | 4/2006 | Handel et al. |
| 2006/0090185 A1 | 4/2006 | Zito et al. |
| 2006/0095329 A1 | 5/2006 | Kim |
| 2006/0111955 A1 | 5/2006 | Winter et al. |
| 2006/0173747 A1 | 8/2006 | Gantman et al. |
| 2006/0178932 A1 | 8/2006 | Lang |
| 2006/0206412 A1 | 9/2006 | Van Luchene et al. |
| 2006/0235754 A1 | 10/2006 | Walker et al. |
| 2006/0247954 A1 | 11/2006 | Hunt |
| 2006/0287897 A1 | 12/2006 | Sobalvarro et al. |
| 2007/0011187 A1* | 1/2007 | Chitgupakar ............ G06N 3/08 |
| 2007/0016439 A1* | 1/2007 | Stiles .................. G06Q 30/0601 |
| | | 705/5 |
| 2007/0016514 A1 | 1/2007 | Al-Abdulqader et al. |
| 2007/0033087 A1 | 2/2007 | Combs et al. |
| 2007/0060099 A1 | 3/2007 | Ramer et al. |
| 2007/0143153 A1 | 6/2007 | Ashby et al. |
| 2007/0150349 A1* | 6/2007 | Handel ................ G06Q 30/02 |
| | | 705/14.13 |
| 2007/0162301 A1 | 7/2007 | Sussman et al. |
| 2007/0162328 A1 | 7/2007 | Reich |
| 2007/0174438 A9 | 7/2007 | Johnson et al. |
| 2007/0179836 A1 | 8/2007 | Juang et al. |
| 2007/0192186 A1 | 8/2007 | Greene et al. |
| 2007/0198432 A1 | 8/2007 | Pitroda et al. |
| 2007/0208604 A1 | 9/2007 | Purohit et al. |
| 2007/0244766 A1* | 10/2007 | Goel .................. G06Q 30/0613 |
| | | 705/5 |
| 2008/0004917 A1 | 1/2008 | Mortimore |
| 2008/0004918 A1 | 1/2008 | Orttung et al. |
| 2008/0004919 A1 | 1/2008 | Stubbs |
| 2008/0004921 A1 | 1/2008 | Orttung et al. |
| 2008/0004980 A1 | 1/2008 | Hernandez |
| 2008/0010100 A1 | 1/2008 | Orttung et al. |
| 2008/0046298 A1 | 2/2008 | Ben-Yehuda et al. |
| 2008/0052413 A1 | 2/2008 | Wang et al. |
| 2008/0065509 A1 | 3/2008 | Williams |
| 2008/0086564 A1 | 4/2008 | Putman et al. |
| 2008/0091477 A1 | 4/2008 | Mortimore |
| 2008/0091478 A1 | 4/2008 | Messa |
| 2008/0091479 A1 | 4/2008 | Mortimore |
| 2008/0147450 A1 | 6/2008 | Mortimore |
| 2008/0155470 A1 | 6/2008 | Khedouri et al. |
| 2008/0201197 A1 | 8/2008 | Orttung et al. |
| 2008/0201432 A1 | 8/2008 | Orttung et al. |
| 2008/0248815 A1 | 10/2008 | Busch |
| 2009/0006143 A1 | 1/2009 | Orttung et al. |
| 2009/0030609 A1 | 1/2009 | Orttung et al. |
| 2009/0030742 A1 | 1/2009 | Orttung et al. |
| 2009/0030769 A1 | 1/2009 | Orttung et al. |
| 2009/0055271 A1 | 2/2009 | Drefs et al. |
| 2009/0101710 A1 | 4/2009 | Chakravarthy |
| 2009/0112639 A1 | 4/2009 | Robinson Beaver |
| 2009/0125380 A1 | 5/2009 | Otto et al. |
| 2009/0210261 A1 | 8/2009 | Mortimore, Jr. |
| 2009/0248457 A1 | 10/2009 | Munter et al. |
| 2010/0023357 A1* | 1/2010 | Walker ................ G06Q 10/063 |
| | | 705/5 |
| 2010/0023407 A1 | 1/2010 | Grady et al. |
| 2010/0161392 A1 | 6/2010 | Ashby et al. |
| 2010/0312611 A1* | 12/2010 | Henderson ............ G06Q 10/04 |
| | | 705/7.36 |
| 2010/0317420 A1 | 12/2010 | Hoffberg |
| 2011/0004497 A1 | 1/2011 | Mortimore, Jr. et al. |
| 2016/0055523 A1 | 2/2016 | Handel et al. |
| 2020/0167803 A1 | 5/2020 | Mortimore et al. |

OTHER PUBLICATIONS

Amendment and Response to Non-Final Office Action filed at the US Patent & Trademark Office dated Oct. 27, 2008, for U.S. Appl. No. 11/388,360.

Chakravarthy, Sriam et al., U.S. Appl. No. 11/178,107, entitled "Asynchronous, Location-Independent Web Service Invocation", filed Jul. 7, 2005.

Grady, Patrick et al., U.S. Appl. No. 10/338,363, entitled "Automatic Services Exchange", filed Jan. 7, 2003.

Grady, Patrick et al., U.S. Appl. No. 10/855,269, entitled "Coordination for Group Procurement of Services", filed May 26, 2004.

(56) References Cited

OTHER PUBLICATIONS

Handel, Sean et al., U.S. Appl. No. 11/321,769, entitled "Method and System for Prediction and Delivery of Time and Context Sensitive Services", filed Dec. 28, 2005.

Handel, Sean et al., U.S. Appl. No. 11/388,360, entitled "Method and System for Traffic Tracking and Conversion Tracking", filed Mar. 23, 2006.

Handel, Sean et al., U.S. Appl. No. 11/395,413, entitled "Method and System for Viral Distribution of Short-term Location Orientated Offers", filed Mar. 30, 2006.

Hernandez, Rick et al., U.S. Appl. No. 11/323,766, entitled "Method and System for Transferring of Stateful Screen in a Stateless Session", filed Dec. 30, 2005.

Paranadi, Shiva et al., U.S. Appl. No. 11/315,421, entitled "Method and System for Interacting via Messages with a Travel Services System", filed Dec. 21, 2005.

Patwardhan, Shantau et al., U.S. Appl. No. 11/121,861, entitled "Method and System for Reporting Work Hours by Phone or Other E-Media", filed May 3, 2005.

Patwardhan, Shantau et al., U.S. Appl. No. 11/178,032, entitled "Method and System for Booking an Open Return Ticket Online", filed Jul. 7, 2005.

Business Editors, "Restaurant Row Selects ServeClick from Connectria to Power its Advanced Online Restaurant E-scheduling," Business Wire, New York, Feb. 1, 2000.

Hwang, Yong Ho et al., "An efficient revocation scheme for stateless receievers," Editors: Katsikas-S-K, Gritzalis-S, Lopez-J, Jun. 2004, pp. 1-2.

Kanaley, Reid, "More Ways Than One to Access Crowded AOL," Philadelphia Enquirer, p. FI, Jan. 16, 1997.

Orbitz, LLC, search results of online search for flights at www.orbitz.com, Mar. 11, 2009.

Reed, Dan et al., "More people find ways to squeeze fun into work trips; For many business travelers, taking family or friends on a trip at relatively low cost has become a handy job perk," USA Today, McLean VA, May 20, 2003, p. E12.

Sharkey, Joe, "Leisure activities are increasingly being fitted in to help make life on the road less of a grind," The York Times, New York, N.Y., Apr. 18, 2001, p. C6.

Smith, Calvin et al., "The Talaris Services Business Language: A Case Study on Developing XML Vocabulaires Using the Universal Business Language," School of Information Management & Systems, University of California, Sep. 2002, pp. 1-16.

\* cited by examiner

SYSTEM FOR RESOURCE SERVICE PROVIDER

RELATED APPLICATIONS

The present application is a continuation of U.S. patent application Ser. No. 14/834,277, filed Aug. 24, 2015, entitled "SYSTEM FOR RESOURCE SERVICE PROVIDER", which is a continuation of U.S. patent application Ser. No. 11/388,540, filed Mar. 23, 2006, entitled "Method and system for resource planning for service provider", which is a continuation-in-part of U.S. patent application Ser. No. 11/321,769, entitled "Method and System for Prediction and Delivery of Time-and Context-Sensitive Services," filed Dec. 28, 2005, the entire disclosures of which are incorporated herein by references.

BACKGROUND OF THE INVENTION

Location-based systems for tracking and mapping the movements of a subject rely mainly on technologies such as global positioning system (GPS) technology, such as Locate911, GPS/911, NAVSTAR GPS, or other equivalent technologies. They can give the identity of a person, the time, and their location. But while some services work globally, without regard to network or location on Earth, others are restricted to a specific network and or specific coverage locations. Some services use such technology to provide, for example, interactive network-based driving instructions. Rather than offering a car-based satellite navigation system, such a service uses a phone, usually a cell phone, to send its GPS information periodically to a server, which then uses that information to send maps of the current location, such as a street or other locator, back to the phone. Thus a user may enter (into said device) a target location and the phone can then display and guide the user through a route to the target. Other systems may provide people with auxiliary services such as, for example, a selection of restaurants nearby.

SUMMARY

In one embodiment, method that can be performed on a system, is provided to take not just a person's time and location into consideration, but also has knowledge of and takes into account their availability, their preferences, their schedule, their purpose for being at their current location, and/or their next goal or stop (not just in terms of location but also in terms of activity). One embodiment is able to take into account a real-time view of supplier inventory and deduce and make available much better-adapted offerings and support for that person's travels and endeavors. In one embodiment, having an understanding of a rate of conversion and its relation to traffic and weather patterns allows service providers to make more accurate predictions about various items, including but not limited to, conversion rates, offer types, offer upgrades, traffic etc.

In yet another aspect of the invention, the information collected from many travelers, and also information collected from airlines and weather observers, etc., can be used to forecast inventory requirements, such as obtaining and preparing fresh food and pulling from storage chilled or frozen food, as well as man power or staffing level requirements, to meet projected demands.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
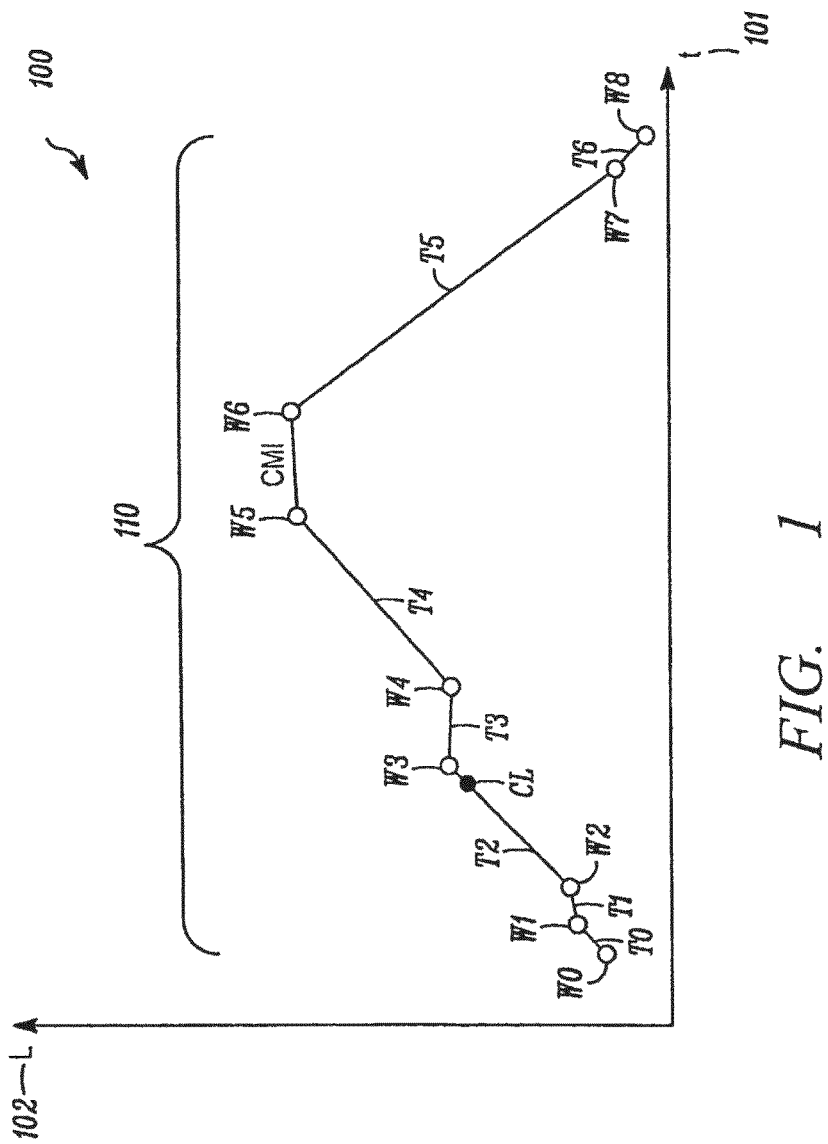
FIG. 1 presents an exemplary time-and-location graph, mapping the travels and activities of a person, in accordance with one embodiment.

FIG. 1 shows an exemplary time-and-location graph 100, mapping the travels and activities of a person. Locations are plotted along vertical axis l 102, and times are plotted along horizontal axis t 101. Way points W0-W8, which are locations where a person has some planned activity that relates to their business or their travel, and meeting segment M1 lie along travel segments T0-T6. For example, the travel segment T3 between points W3 and W4 could be when and where a traveler changes planes in O'Hare Airport in Chicago, moving between his arrival gate, which in this example is W3, and his departure gate, which in this example is W4. The traveler arrives on a plane whose flight is travel segment T2, and he must depart on another plane whose flight is travel segment T4. His location, which, in this example, is his current location CL, is on the arrival path into the airport, as indicated by the placement of CL on travel segment T2.

Figure 2:
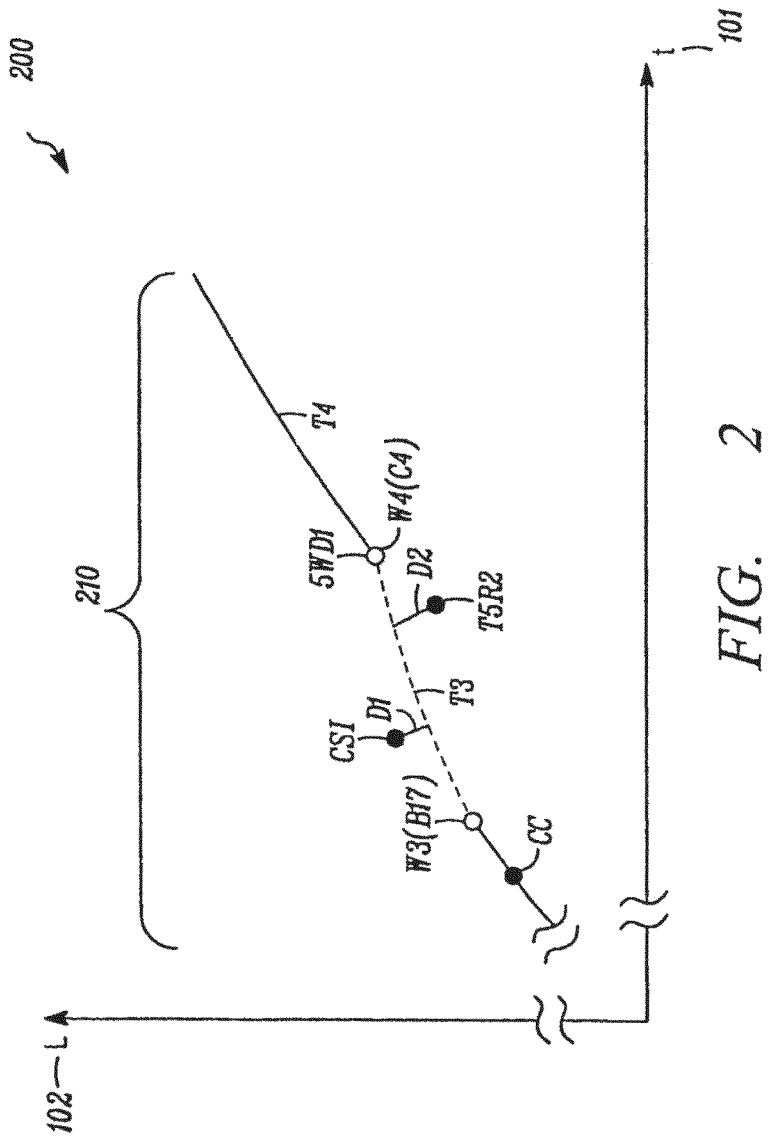
FIG. 2 presents a time-and-location graph that shows the plane-change portion of the trip, in accordance with one embodiment.

FIG. 2 is a time-and-location graph 200 that shows the plane-change portion of the trip mentioned as an example in the description of FIG. 1, above. Current location CL is shown in magnified graph section 210. Way point W3 could be, for example, gate B17, where the traveler arrives, and way point W4 could be gate C4, where he is scheduled to depart. Thus the traveler must walk, in this case, from W3 to W4, along travel segment T3. Along this segment lie a coffee shop CS1, for example, or a full-service restaurant FSR2, at certain distances D1 and D2 from point W3. With the predictive context-sensitive awareness system of this invention, the traveler's phone could tell him that he does not have food service on his next flight and could also tell him the location of restaurants CS1 and FSR2 in the path between gates, basing the selection of these two restaurants for his information on his past preferences. In addition, based on merchant agreements for priority listings, various food merchants in the airport may receive notification of the traveler's future planned and current activity, so in real time/dynamically, or in the future, these merchants could offer the traveler a discount coupon to attract him to their business, or could send him an online menu so he could, for example, view the menu and order food to be ready when he arrives, either for on-site consumption or to go for his next flight. Further, referring to his preferences and past behavior, the system may submit only certain of these offers to him.

Additionally, in one embodiment a real-time/dynamic link to the supplier's inventory system affects which offers are made by suppliers. For example, a café might have twice the expected inventory of chocolate chip cookies, which can't be sold beyond four hours from time of baking. Based on this inventory level, the supplier system would offer free chocolate chip cookies to passers by until the inventory level reaches the supplier's expected levels again, at which point the offers would stop.

Figure 3:
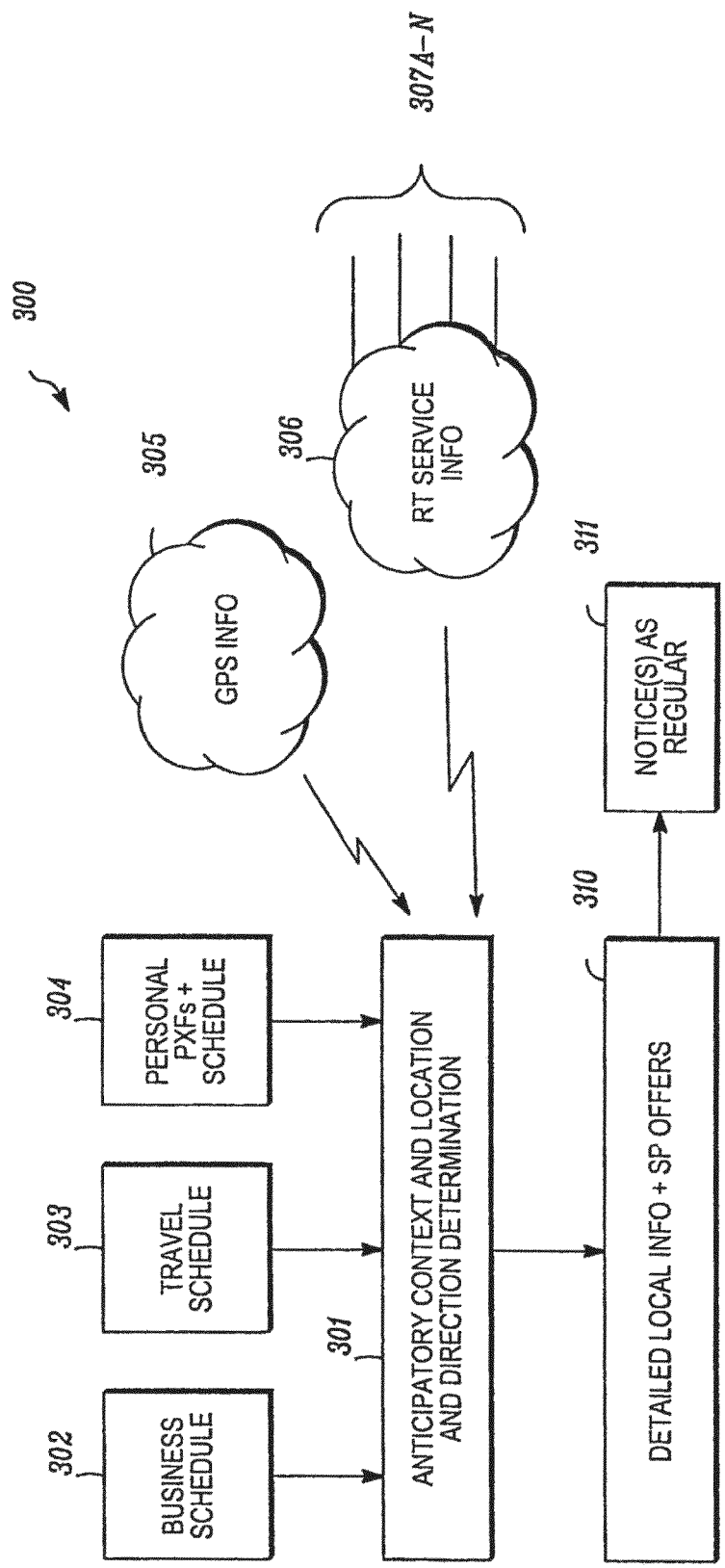
FIG. 3 shows an overview of the architecture of one embodiment of a system.

FIG. 3 shows an overview of the architecture of one embodiment of a system 300. The anticipatory context and location-sensitive and direction-determination system 301 is using information coming from many source, such as the business schedule 302, the travel schedule 303, and the personal preferences and schedule of the traveler 304. Information also comes from the GPS information from user's device 305 (this may be GPS or other equivalent location technology, herein generally referred to as GPS) and real-time service provider information 306, which may be provided by any of a large variety of service providers in real time through connections 307a-n. In other cases this information may be collected in another section of a service platform and provided directly from there. This information may trickle in based on travel schedules, or it may be returned based on requests specific to the travel schedule being examined. This supplier information would include information on the real-time status of inventory levels and the state of the supplier's yield management system. The information is then processed with detailed local information and service provider offers in section 310, and the results are processed and are sent as notices to the user or to other members of his business team, family, or other involved persons, or to service providers as required.

In one embodiment the individual service events that are booked for a user report relevant events it creates to a centralized system. In one embodiment, the structure for the events generated by services include any of multiple parameters, such as the date and time of the event start; the date and time of the event end; the location (address, airport, train station, etc.) where that event starts; the location (address, airport, train station, etc.) where that event ends; the type of travel between destinations, which may include, but is not limited to, such carriers as airplane, car, and train; the location of travel between destinations, which may include, for example, traveling between, at destination, or near destination; people who are sharing this event (for example, if a limo is booked with two passengers, then those two people would be named); availability of people involved in event; and options such as not available or available via such communication means as mobile phone, work phone, home phone, text messaging, email, or instant messenger.

In other embodiments, the events also include surrounding time periods affected by this reservation. For example, the fact that a traveler has a flight that is scheduled to depart at 4 p.m. means that he is likely to be traveling to the airport for some period of time before that flight departs and will be unavailable for certain things such as phone calls, email or marketing offers. However, if said traveler has a layover between flights, he may be available to receive offers for restaurants in the B concourse at O'Hare offering discounts to him over his mobile phone. In addition, the user should be able to set preferences for each service that indicate how he would like to be available during specific events. For example, the flight service may allow the user to indicate that during the layover period at an airport, he is available via SMS and email, but not by phone. One embodiment allows for a more detailed availability model controlled in part by the user. One embodiment also allows for a detailed analysis of the dependencies between services. For example, if a user changed his flight leaving from SFO, the system could derive from this event list that he probably also wants to change his airport parking service at SFO.

In one embodiment, if a travel line (time and/or place) is changed due to, for example, a late flight, changed plans, or early or late conclusion of business at a certain stop may include, but are not limited to, notification of affected parties, such as a limo service (to reschedule a pick-up time), family and/or friends, a hotel (to reschedule, cancel, or book reservations), a restaurant (also to reschedule, cancel, or book reservations); and making alternate arrangements, based on known preferences, such as booking a limo instead of a cab, booking an earlier or later flight, including seat reservations, arranging a car rental, presenting public transportation routes and schedules with information about getting via shuttle or train from the airport to the hotel, etc. For example, the system may let the traveler know whether a nearby hotel has early check-in available, thus letting the traveler decide whether to proceed to the hotel and take a shower, or shower at the airport lounge, or go to an offsite restaurant.

One embodiment also coordinates offers from businesses and suppliers, based on knowledge of a traveler's stops and route/path, such as special deals, based on known preferences and past spending from businesses more or less along the traveler's path. Suppliers may send a movie, documents, restaurant menu, etc., for the next flight segment, to pick up at the airport, waiting at the gate, or, in the case of digital items, even directly to user's devices such as a mobile phone or personal digital assistant (PDA). For example, a traveler may order a movie or other program in flight, so it can be downloaded and ready when the plane lands, waiting on a DVD or ready for transfer to a memory stick. Further, one embodiment sends the traveler messages with information about the airport, such as whether passing through a security checkpoint is required to get to a certain merchant or for changing buildings, etc., or about the availability of services in and out of the airport security zone (i.e., for a quick meeting with local non-traveler, etc.).

With predictive knowledge of future traffic near their establishment at a given time period, suppliers can prepare in various ways, such as, for example, by ordering appropriate amounts of perishable food, by making special offers based on light traffic (deeper discounts) or heavy traffic (discounts on food to go, to reduce crowding on site). Also, the further a merchant is off the route of a traveler, the more of an incentive the merchant may offer to the traveler to go to his establishment, in addition to a low traffic discount.

One embodiment schedules variable intervals of GPS checking, such as every 15 seconds, 30 seconds, 5 minutes, 1 km, etc. Further, the checking interval may depend on the traveler's location and available services. For example, in an airport, precise location is important because of the many services available in the area, while the location of a car traveling across the Mojave Desert is less critical because there are no services for miles.

The installation of microcells on airplanes facilitates cell phone GPS and predictive services as described herein. Further, one embodiment use subsets of microcells (IP addresses), to ascertain the traveler's location very specifically; for example, on a particular flight, or at some other specific location. Thus by checking the traveler's ID and having knowledge of his plans and schedule, one embodiment ensures that he is in the right place at the right time, e.g., at the right gate for the correct flight. Alternative embodiments may apply to other situations besides airplanes, including but not limited to cars, busses, boats, trains etc.

As the system detects changes or deviations from the predicted itinerary, the offers of service are adjusted accordingly, in one embodiment. For example, if a traveler's flight is cancelled and the traveler is rebooked on a flight early the next morning, the system could offer bookings at nearby hotels.

One embodiment includes countermeasures to prevent unauthorized knowledge of the user's ID, for security purposes.

In one embodiment payment options, such as the use of credit cards such as American Express, VISA, Master Card, etc., and payment services such as PayPal, because they are accepted universally, even by small businesses. Thus, codes for discounts and promotions delivered to the user can be applied to credit card charges.

Figure 4:
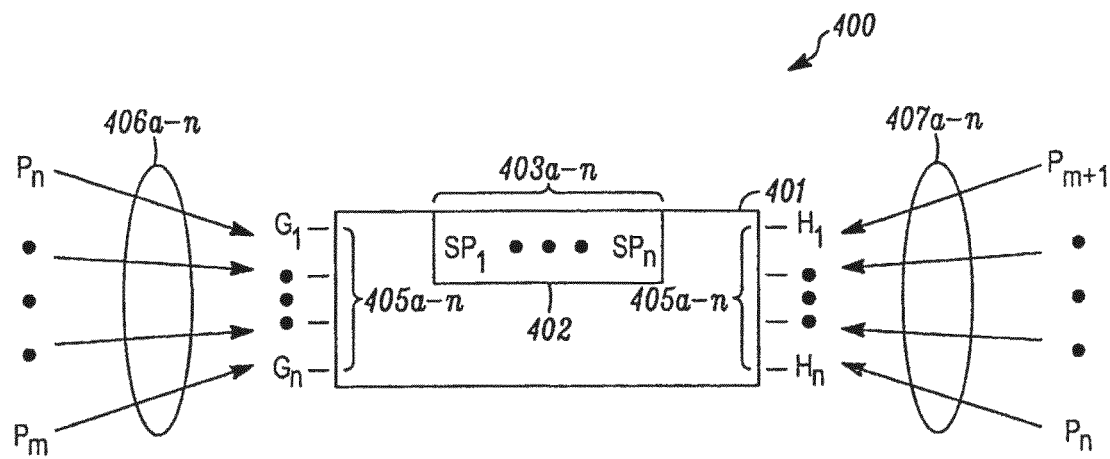
FIG. 4 illustrates an example travel environment.

FIG. 4 shows an example travel environment 400. It is clear that this travel environment is only exemplary and other kinds of environments are also applicable, including those examples given above, but for purposes of clarity and simplicity the focus shall be on this example environment. Terminal 401 is a typical commercial airline terminal, with two sets of gates G1-Gn 404a-n and H1-Hn 405a-n. There is also food court 402 with a concentration of service providers SP1-SPn 403a-n. Planes P1-Pn come from both sides, as indicated by arrows 406a-n and 407a-n. In such an environment, most airline flights are typically to or from a hub terminal, wherein travelers arrive and then leave again on connecting flights within a very short period of time.

Figure 5:
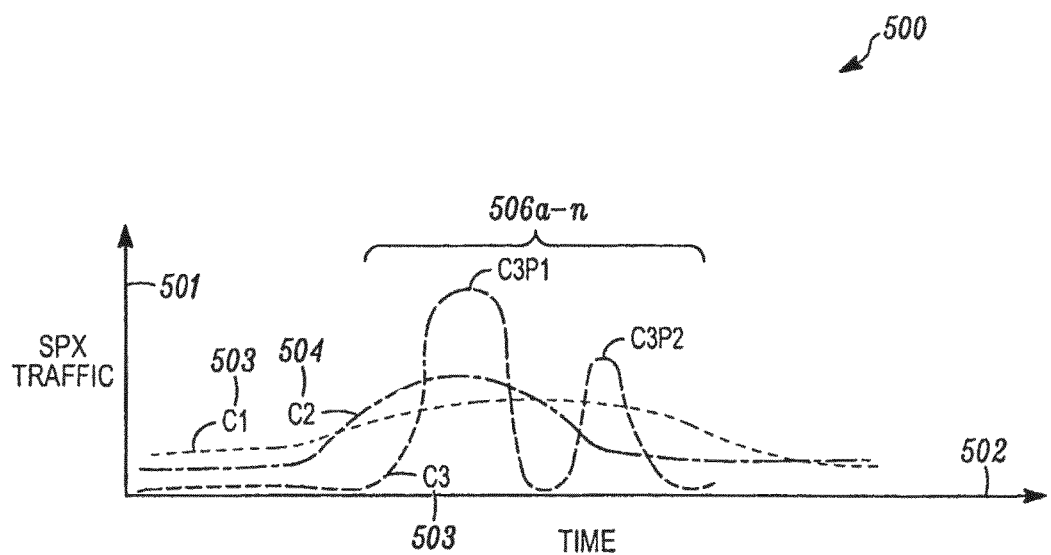
FIG. 5 illustrates a graph of traffic variations at service provider.

FIG. 5 shows a graph 500 of traffic variations at service provider SPx. The traffic quantity is shown on the vertical axis 501 and the time range is shown on the horizontal axis 502. Three example traffic curves are shown: curve C1 503, curve C2 504, and curve C3 505. Each curve has a different peak, or peaks, in the peak area 506a-n. For example, curve C1 has a flat spread, in the case that the arrival and departure of planes is spread over a wider range of time, due perhaps to intentional scheduling and also to early and late arrival of some planes; while curve C2 shows a medium peak, with tighter scheduling but also with a few flights being delayed and others being early, resulting in a more condensed peak traffic; and curve C3, due to, for example, schedule changes or weather-related problems in some part of the country, has two very sharp peaks C3P1 and C3P2. Depending on various conditions, such as scheduling and weather, as well as the amount and availability of food on the airplanes, the rate of conversion of offers tendered to travelers for goods and services at the terminal into sales may change, because people, if given a choice between having a snack and catching the next flight, will normally opt for catching the next flight. Having an understanding of the rate of conversion and its relation to traffic and weather patterns allows service providers to make more accurate predictions about various items, including but not limited to, conversion rates, offer types, offer upgrades, traffic etc.

Figure 6:
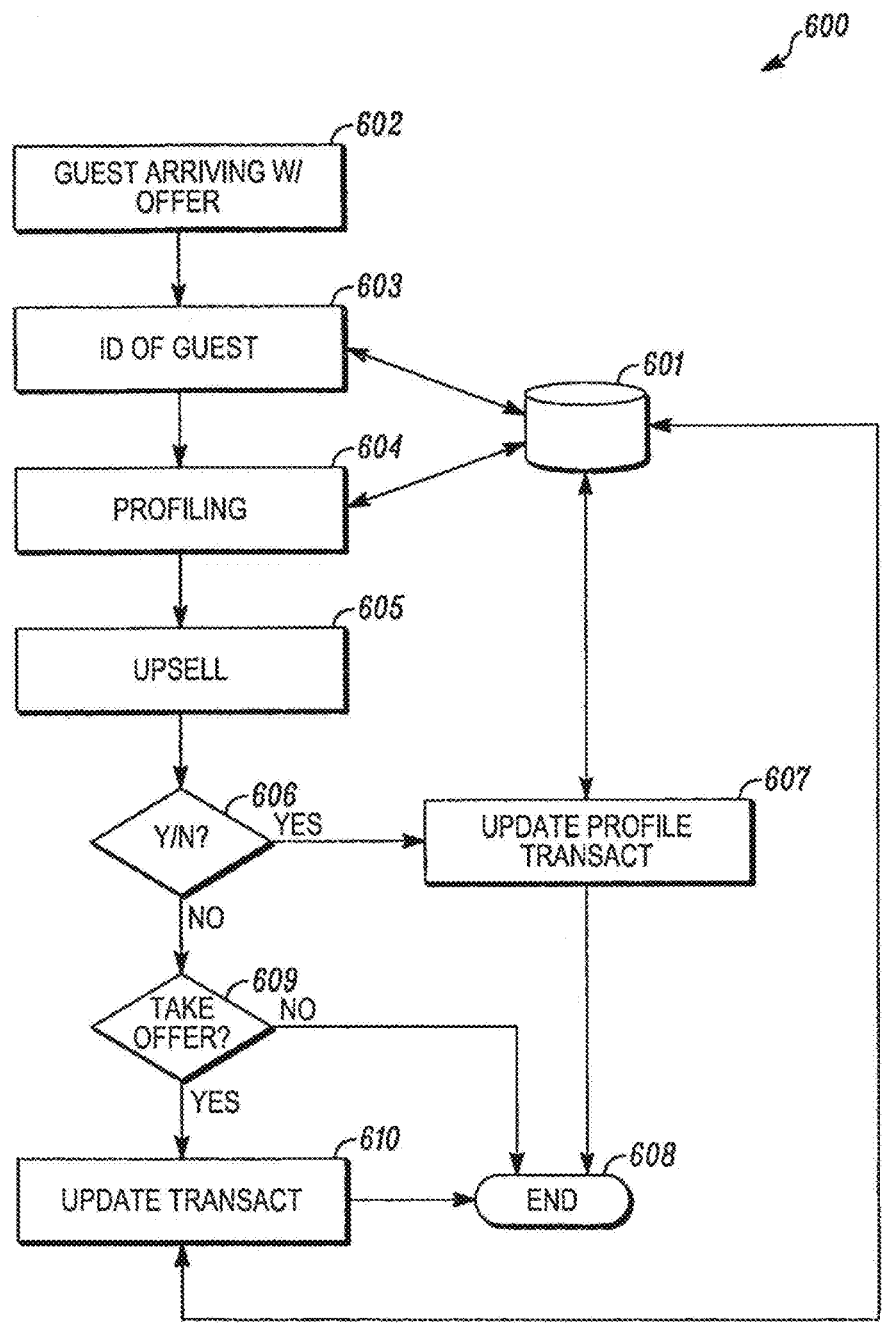
FIG. 6 provides a diagram of a process flow that could be used to analyze the conversions, in accordance with one embodiment.

FIG. 6 is a diagram of a process flow 600 that could be used to analyze the conversions. In process 602, a guest arrives at the service provider with an offer (typically, for food or other merchandise, or for a service). In process 603, a guest's ID is compared to information stored in database 601, which could be a local database, or part of a larger remote database, or two synchronized databases, or some combination of the these. In process 604 the profile information about the registered guest (i.e., traveler) is extracted from database 601, then used to update the profile. In particular, You download the profile to do what ever you do, then you may want to update what it is that you have done (e.g. a new offer), and possibly what the customers reaction to that offer was etc. In process 605, an up-sell (upgrade of the offer) may be offered to the guest. At process 606, the process branches. If the guest accepts (YES), the process moves to process 607, where the transaction takes place and the guest profile is updated in database 601, and then to process 608, where the process ends. If, in process 606, the guest does not accept the up-sell (NO), the process moves to process 609, where it again branches. If the guest accepts the original offer (YES), in process 610 the transaction takes place, the guest profile is updated (in some cases, the supplier database may be updated as well) in database 601, and the process moves to process 608, where it ends. If the guest does not accept the original offer (NO), the process ends at process 608.

Additional information, including but not limited to, conversion rates by flight, day of the week, season, weather, flight size, flight utilization, etc., may be collected by individual service providers and then pulled together for further analysis and refined prediction models, allowing more targeted offers. Many modifications can be made without departing from the spirit of the invention. In some cases, for example, the service providers may have their own systems interface with the system of the present invention. In other cases, a solution may be extended by the operator of such a system, offering a complete solution based on a simple terminal device, or in yet other cases, a system may be offered by a credit card or other business service provider, as part of a larger package.

In yet another aspect of the invention, the information collected from many travelers, and also information collected from airlines and weather observers, etc., can be used to forecast inventory requirements, such as obtaining and preparing fresh food and pulling from storage chilled or frozen food, as well as man power or staffing level requirements, to meet projected demands.

Figure 7:
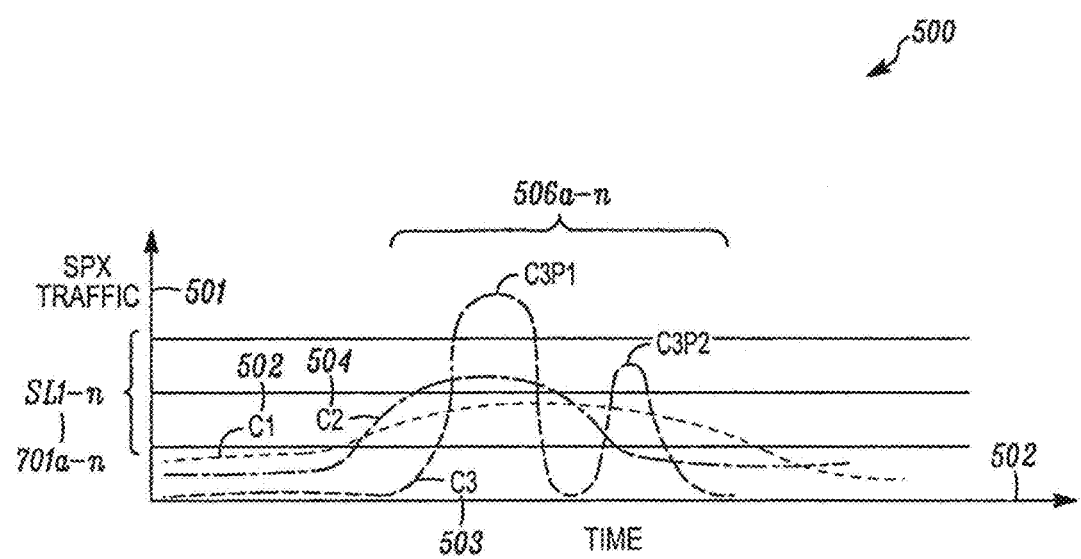
FIG. 7 illustrates a graph of traffic variations at service provider.

FIG. 7 shows a traffic graph with many of the same elements as FIG. 5 (see description, above). What has been added are horizontal lines indicating staffing levels SL1-n 701a-n. Thus when traffic peaks to the next line SLn, a higher staffing level would be required. Hence calculations must be made to forecast staffing levels some time ahead of the forecasted peak traffic, because people need notice to come to a work place. In a similar manner, forecasted food requirements must be calculated; for example, how many rolls need to be prepared and baked so there are freshly baked rolls when customers arrive at peak traffic times, etc.

Figure 8:
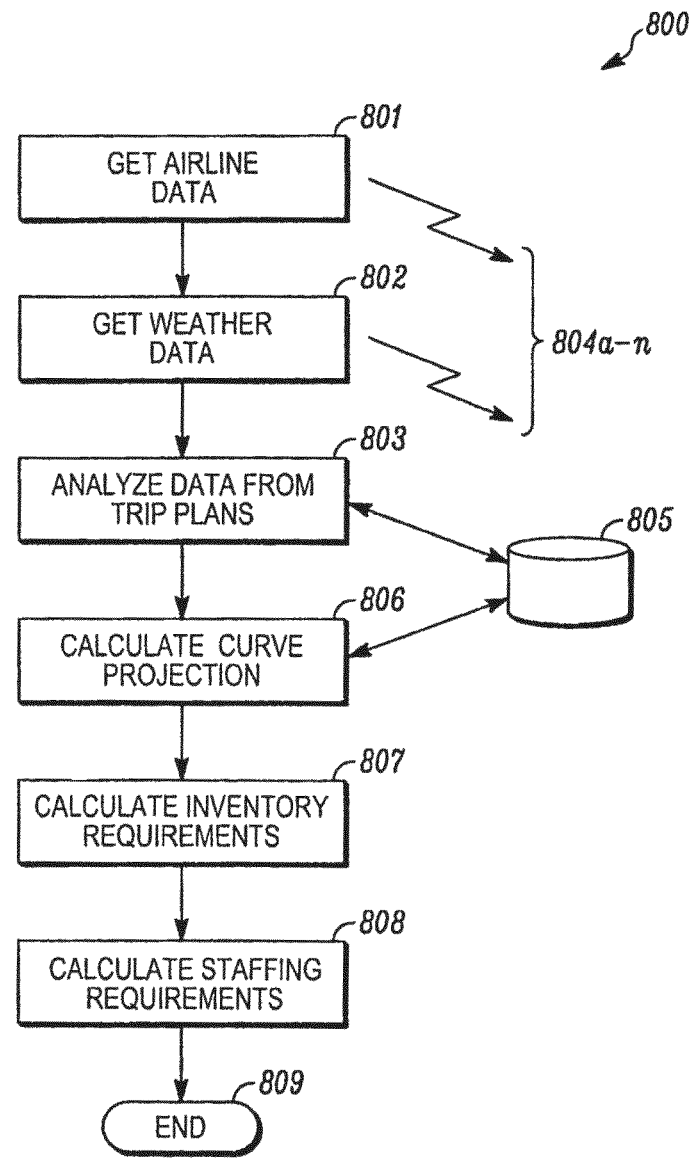
FIG. 8 provides a diagram of a process for calculations in support of forecasting, in accordance with one embodiment.

FIG. 8 is a diagram of a process flow 800 for calculations required for the types of forecasting discussed above. In step 801 the system obtains airline data, such as arrival and departure times, both actual (real-time) information and statistical models, as well as usage of the airplane and the airplane model, allowing the system to estimate the number of people expected at a certain time. The data is obtained via communication lines 804a-n, which may connect to a local or remote database in the system, or to both, or directly to a service provider. The weather data is collected in a similar manner in step 802, including, but not limited to, weather data from each flight's point of origin and weather data at the current airport location, because weather experienced at the beginning, during, and end of the flight may impact how travelers feel; whether they are more or less thirsty and/or hungry. Cold and rainy weather may promote the use of warm "comfort foods" while hot and dry weather promotes lighter foods and cold drinks, smoothies etc. This may also be modified by where travelers go to or come from, as the expectation of weather at the end of a trip, or just experienced weather a short while ago may impact how travelers feel about what food they desire. Large statistical gathering, preferably by demographics as well, may allow to cull meaningful data allowing to make better predictions, and hence reduce potential waste. In step 803, data is analyzed from known members, typically the registered travelers using the service (but in some cases, that may include planes, or groups of travelers including non-registered ones etc.) that have a well known track record. This information of these "well-known" or "bell weather" travelers can then be extrapolated, particularly in cases of insufficient statistical data for a current event, using also correlation to other information, including, but not limited to, historic data on weather, plane timeliness, plane capacity and usage, etc., some of which may be also stored in DB 805. All this information is then used in step 806 to calculate forecasted curves of required resources (inventory and man power). The system may not calculate just one curve, but multiple curves; for example, one each for multiple types of inventory, one for staffing level, and one each for other similar resources required by the service provider. In step 807 the actual requirements for each inventory item are calculated, with quantities given in ordering lots; for example, the rolls would be calculated by the tray, or fresh fruit would be calculated by the case, etc. In step 808, also according to the curves, the staffing level is likewise calculated, so that if necessary additional workers may be called in as auxiliary staff (not shown). In step 809, the process ends.

It is clear that many modifications and variations of this embodiment may be made by one skilled in the art without departing from the spirit of the novel art of this disclosure. Additional information, including but not limited to, resource requirements by flight, day of the week, season, weather, flight size, flight utilization, etc., may be collected by individual service providers and then pulled together for further analysis and refined prediction models, allowing more targeted resource predictions. Many modifications can be made without departing from the spirit of the invention. In some cases, for example, the service providers may have their own systems interface with the system of the present invention. In other cases, a solution may be extended by the operator of such a system, offering a complete solution based on a simple terminal device, or in yet other cases, a system may be offered by a credit card or other business service provider, as part of a larger package.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive).

Alternatively, the logic to perform the processes as discussed above could be implemented in additional computer and/or machine readable media, such as discrete hardware components as large-scale integrated circuits (LSI's), application-specific integrated circuits (ASIC's), and firmware such as electrically erasable programmable read-only memory (EEPROM's).

What is claimed is:

1. A computer implemented method comprising:
obtaining airline data via a computing device, wherein the airline data comprises one or more of arrival and departure times for airline flights scheduled to arrive at a destination, capacity of the airline flights, and type of airplane to be used in the airline flights scheduled to arrive at the destination;
generating, via the computing device, an estimate of a quantity of travelers to arrive at the destination via air travel at designated time periods based at least in part on the obtained airline data;
obtaining, via the computing device, data related to a plurality of air travel itineraries previously booked by a plurality of the travelers, the air travel itinerary-related data comprising anticipatory locations determined based on GPS information;
obtaining, via the computing device, a link to a real-time inventory system associated with services or products;
selecting, via the computing device, the services or products to be offered to a plurality of the travelers as a plurality of offerings, wherein the services or products are selected based at least in part on (1) the air travel itinerary-related data and (2) a status on real-time inventory levels via the link;
identifying, via the computing device, a quantity of services or products needed to support the offerings; and
forecasting, via the computing device, the quantity of services or products based on extrapolation of historic data and the identified quantity of services or products needed to support the offerings.

2. The method of claim 1, wherein the air travel itinerary-related data further comprises weather data for the destination.

3. The method of claim 2, wherein the historic data used for the extrapolation includes one or more of plane timeliness, plane capacity, and plane usage.

4. The method of claim 2, wherein the air travel itinerary-related data further comprises weather data related to weather experienced or forecasted to be experienced by a set of the travelers during a traveling to the destination.

5. The method of claim 1, wherein the identifying comprises identifying the quantity of services or products needed to support the offerings based at least in part on (1) the estimate of the quantity of travelers and (2) the selected services or products.

6. The method of claim 1, further comprising:
obtaining a profile of one or more of the travelers to arrive at the destination, individual profiles identifying at least one of preferred services or preferred products of a traveler, or a history of purchased services or products of a traveler.

7. The method of claim 6, wherein the selecting comprises selecting services or products for the offerings based at least in part on the obtained profiles.

8. The method of claim 7, further comprising:
performing the selecting and the identifying for multiple separate time periods.

9. The method of claim 8, wherein the identified quantity of services or products comprises an inventory of products.

10. The method of claim 1, further comprising:
before providing a second offer to a traveler, presenting a first offer to the traveler representing an attempt to up-sell, the first offer an upgrade of the second offer.

11. A non-transitory tangible machine-readable medium having stored thereon a set of instructions, which when executed perform processes comprising:
obtaining airline data, wherein the airline data comprises one or more of arrival and departure times for airline flights scheduled to arrive at a destination, capacity of the airline flights, and type of airplane to be used in the airline flights scheduled to arrive at the destination;
generating an estimate of a quantity of travelers to arrive at the destination via air travel at designated time periods based at least in part on the obtained airline data;
obtaining data related to a plurality of air travel itineraries previously booked by a plurality of the travelers, the air travel itinerary-related data comprising anticipatory locations determined based on GPS information;
obtaining a link to a real-time inventory system associated with services or products;
selecting services or products to be offered to the travelers, the services or products to be offered to a plurality of the travelers as a plurality of offerings, wherein the services or products are selected based at least in part on (1) the air travel itinerary-related data and (2) a status on real-time inventory levels via the link;
identifying a quantity of services or products needed to support the offerings; and
forecasting the quantity of services or products based on extrapolation of historic data and the identified quantity of services or products needed to support the offerings.

12. The machine-readable medium of claim 11, wherein the air travel itinerary-related data further comprises weather data for the destination.

13. The machine-readable medium of claim 11, wherein the historic data used for the extrapolation includes one or more of plane timeliness, plane capacity, and plane usage.

14. The machine-readable medium of claim 13, wherein the processes performed in response to execution of the instructions further comprise:
before providing a second offer to a traveler, presenting a first offer to the traveler representing an attempt to up-sell, the first offer an upgrade of the second offer.

15. The machine-readable medium of claim 11, wherein the obtained airline data comprises the arrival and departure times for the airline flights scheduled to arrive at the destination, the capacity of the airline flights, and the type of airplane to be used in the airline flights scheduled to arrive at the destination.

16. A computer system comprising:
at least one server comprising at least one processor, and memory in communication with the processor, the memory storing instructions that, when executed by the processor, cause the server to:
obtain airline data, wherein the airline data comprises one or more of arrival and departure times for airline flights scheduled to arrive at a destination, capacity of the airline flights, and type of airplane to be used in the airline flights scheduled to arrive at the destination;
generate an estimate of a quantity of travelers to arrive at the destination via air travel at designated time periods based at least in part on the obtained airline data;
obtain data related to a plurality of air travel itineraries previously booked by a plurality of the travelers, the air travel itinerary-related data comprising anticipatory locations determined based on GPS information;
obtain a link to a real-time inventory system associated with services or products;
select the services or products to be offered to the travelers, the services or products to be offered to a plurality of the travelers as a plurality of offerings, wherein the services or products are selected based at least in part on (1) the air travel itinerary-related data and (2) a status on real-time inventory levels via the link;
identify a quantity of services or products needed to support the offerings; and
forecast the quantity of services or products based on extrapolation of historic data and the identified quantity of services or products needed to support the offerings.

17. The computer system of claim 16, wherein the air travel itinerary-related data further comprises weather data for the destination.

18. The computer system of claim 17, wherein the at least one server is to provide a second offer to a traveler, presenting a first offer to the traveler representing an attempt to up-sell, the first offer an upgrade of the second offer.

19. The computer system of claim 17, wherein the historic data used for the extrapolation includes one or more of plane timeliness, plane capacity, and plane usage.

20. The computer system of claim 16, wherein the obtained airline data comprises the arrival and departure times for the airline flights scheduled to arrive at the destination, the capacity of the airline flights, and the type of airplane to be used in the airline flights scheduled to arrive at the destination.

\* \* \* \* \*